(12) United States Patent
Chen et al.

(10) Patent No.: US 11,808,576 B2
(45) Date of Patent: Nov. 7, 2023

(54) DEAD-ZONE-FREE COLD ATOM INTERFEROMETER WITH HIGH FREQUENCY OUTPUT

(71) Applicant: No. 717 Research Institute of China Shipbuilding Industry Corporation, Wuhan (CN)

(72) Inventors: Fusheng Chen, Wuhan (CN); Haicen Mao, Wuhan (CN); Jun Cheng, Wuhan (CN); Min Deng, Wuhan (CN); Huibin Yao, Wuhan (CN); Qiang Guo, Wuhan (CN); Chao Zhou, Wuhan (CN)

(73) Assignee: NO. 717 RESEARCH INSTITUTE OF CHINA SHIPBUILDING INDUSTRY CORPORATION, Wuhan (CN)

( * ) Notice: Subject to any disclaimer, the term of this patent is extended or adjusted under 35 U.S.C. 154(b) by 443 days.

(21) Appl. No.: 17/307,972

(22) Filed: May 4, 2021

(65) Prior Publication Data

US 2021/0262797 A1 Aug. 26, 2021

Related U.S. Application Data

(63) Continuation of application No. PCT/CN2018/125580, filed on Dec. 29, 2018.

(30) Foreign Application Priority Data

Dec. 12, 2018 (CN) .......................... 201811518260.2

(51) Int. Cl.
*G01C 19/58* (2006.01)
*G01B 9/02* (2022.01)
*G21K 1/00* (2006.01)

(52) U.S. Cl.
CPC ............... *G01C 19/58* (2013.01); *G01B 9/02* (2013.01); *G21K 1/006* (2013.01)

(58) Field of Classification Search
CPC .......... G01C 19/58; G01B 9/02; G21K 1/006; G01J 9/02
See application file for complete search history.

(56) References Cited

U.S. PATENT DOCUMENTS

| 9,086,429 B1* | 7/2015 | Biedermann .......... G01C 19/62 |
| 2010/0200739 A1* | 8/2010 | Anderson ............. G21K 1/006 250/251 |

(Continued)

FOREIGN PATENT DOCUMENTS

| WO | WO2019040817 | 3/2016 |
| WO | WO2018154254 | 8/2018 |

*Primary Examiner* — David E Smith

(57) ABSTRACT

The present application discloses a dead-zone-free cold atom interferometer with a high frequency output. The interferometer includes: a three-dimensional magneto-optical trap, wherein a predetermined angle is formed between the first group of light sources and an atomic beam path, the first group of optical stops are arranged at edges of the first group of light sources and downstream of the atomic beam path, the first group of optical stops block laser light emitted from the first group of light sources, the second group of light sources are orthogonally arranged with respect to the first group of light sources, the second group of optical stops are arranged at edges of the second group of light sources and downstream of the atomic beam path, and the second group of optical stops block laser light emitted from the second group of light sources.

3 Claims, 2 Drawing Sheets

(56) References Cited

U.S. PATENT DOCUMENTS

| | | | |
|---|---|---|---|
| 2014/0007677 A1* | 1/2014 | Italiano | G01V 7/02 |
| | | | 73/382 R |
| 2017/0372808 A1* | 12/2017 | Gill | G01B 9/02015 |
| 2019/0376790 A1 | 12/2019 | Ixblue et al. | |

\* cited by examiner

DEAD-ZONE-FREE COLD ATOM INTERFEROMETER WITH HIGH FREQUENCY OUTPUT

CROSS-REFERENCE TO RELATED APPLICATIONS

This application claims priority to China Patent Application No. 201811518260.2, filed on Dec. 12, 2018, the content of which is hereby incorporated by reference in its entirety. This application is a continuation of international patent application PCT/CN2018/125580, filed on Dec. 29, 2018, the content of which is also hereby incorporated by reference in its entirety.

TECHNICAL FIELD

The present application relates to the technical field of cold atom trapping, and specifically, to a dead-zone-free cold atom interferometer with a high frequency output.

BACKGROUND

With the development of cold atom technology, a cold atom interferometer has been used to perform high precision measurement on a physical quantity such as a physical constant, gravitational acceleration, a gravitational gradient, and a rotation.

A working procedure of a cold atom interferometer may include four stages: a trapping stage, an ejection stage, an interference stage, and a detection stage of an interference signal. Because of the characteristics of the cold atom interferometer, there are different requirements for light and magnetic fields in the stages. Therefore, to avoid interference between the stages, an existing cold atom interferometer usually completes the ejection of a group of cold atoms before trapping a next group of cold atoms. When more cold atoms participate in interference, a cold atom interference phenomenon is clearer, and a measurement result is more accurate. Therefore, it is expected that the time of the trapping stage is extended as much as possible, to make the measurement precision of the interferometer reach a relatively high level.

In the prior art, within a running period of the cold atom interferometer, after an interference stage of a group of cold atoms is completed, a next group of cold atoms are still in a trapping stage or an ejection stage. This period is referred to as a measurement dead zone. Theoretically, the ejection frequency of cold atom groups may be increased to implement dead-zone-free measurement. That is, as soon as one complete interference loop is completed for the first cold atom group that is ejected, a next cold atom group that is ejected subsequently is about to enter an interference loop. However, there are a relatively small quantity of atoms in the cold atom group ejected at this time, and it is impossible to provide sufficient measurement information. As a result, the measurement precision of the cold atom interferometer is relatively low. In addition, the structure of the cold atom interferometer is limited. Therefore, it is impossible to simply increase the ejection frequency of cold atom groups to implement dead-zone-free measurement of the cold atom interferometer.

SUMMARY

An objective of the present application is to increase the ejection frequency of cold atom groups and a quantity of cold atoms included in a cold atom group, to implement dead-zone-free measurement of a cold atom interferometer.

The technical solution of the present application is as follows: A dead-zone-free cold atom interferometer with a high frequency output is provided. The interferometer has two groups of cold atom group ejection mechanisms, the two groups of cold atom group ejection mechanisms eject cold atom groups towards each other, and each group of cold atom ejection mechanisms includes: an atomic generator, a two-dimensional magneto-optical trap, and a three-dimensional magneto-optical trap; the atomic generator is configured to: generate an atomic beam, and transmit the atomic beam to the two-dimensional magneto-optical trap; the two-dimensional magneto-optical trap is configured to: receive the atomic beam, and cool atoms in the atomic beam; and the three-dimensional magneto-optical trap includes three groups of light sources and three groups of optical stops, optical axes of the three groups of light sources are orthogonal to each other, the three groups of light sources point to a trapping region in an atomic beam path in a two-by-two orthogonal manner, each group of light sources includes two light sources, and the two light sources are opposite to each other, to use respective emitted light beams to irradiate the trapping region, wherein a predetermined angle is formed between the first group of light sources and the atomic beam path, the first group of optical stops are arranged at edges of the first group of light sources and downstream of the atomic beam path, the first group of optical stops partially block laser light emitted from the first group of light sources, the optical axis of the second group of light sources is orthogonal to the optical axes of the first group of light sources, the second group of optical stops are arranged at edges of the second group of light sources and downstream of the atomic beam path, the second group of optical stops partially block laser light emitted from the second group of light sources, the optical axis of the third group of light sources is orthogonal to the optical axes of the second group of light sources and the third group of light sources, the third group of optical stops are arranged at edges of the third group of light sources and downstream of the atomic beam path, the third group of optical stops partially block laser light emitted from the third group of light sources, a cold atom group emission region is disposed in the trapping region, and a shaded region formed by the first group of optical stops, the second group of optical stops and the third group of optical stops falls in the cold atom group emission region.

Preferably, the interferometer further includes: a magneto-optical trap control apparatus, wherein the magneto-optical trap control apparatus is configured to: when it is determined that a cold atom group enters the shaded region, trap a next cold atom group, e.g., by turning on the three-dimensional cooling light and three-dimensional repumping light of the three-dimensional magneto-optical trap.

Preferably, the magneto-optical trap control apparatus is further configured to eject the cold atom group from a first three-dimensional magneto-optical trap to a second three-dimensional magneto-optical trap at a preset speed, wherein when being ejected at the preset speed, the cold atom group enters the trapping region of the second three-dimensional magneto-optical trap before the three-dimensional cooling light and the three-dimensional repumping light of the second three-dimensional magneto-optical trap are turned off.

The beneficial effect of the present application is as follows: by arranging one optical stop besides each light path of each light source of the three-dimensional magneto-optical trap, a shaded region is formed in a trapping region, so that a wait time for a cold atom group to fly out of the trapping region is reduced. Next, when it is determined that a cold atom group enters the shaded region, three-dimensional cooling light and three-dimensional repumping light of the three-dimensional magneto-optical trap are turned on, to increase the ejection frequency of the cold atom interferometer, thereby implementing dead-zone-free measurement of the cold atom interferometer.

BRIEF DESCRIPTION OF DRAWINGS

The advantages in the foregoing and/or additional aspects of the present application will become apparent and more comprehensible from the following description of the embodiments with reference to the accompanying drawings.

Figure 4:
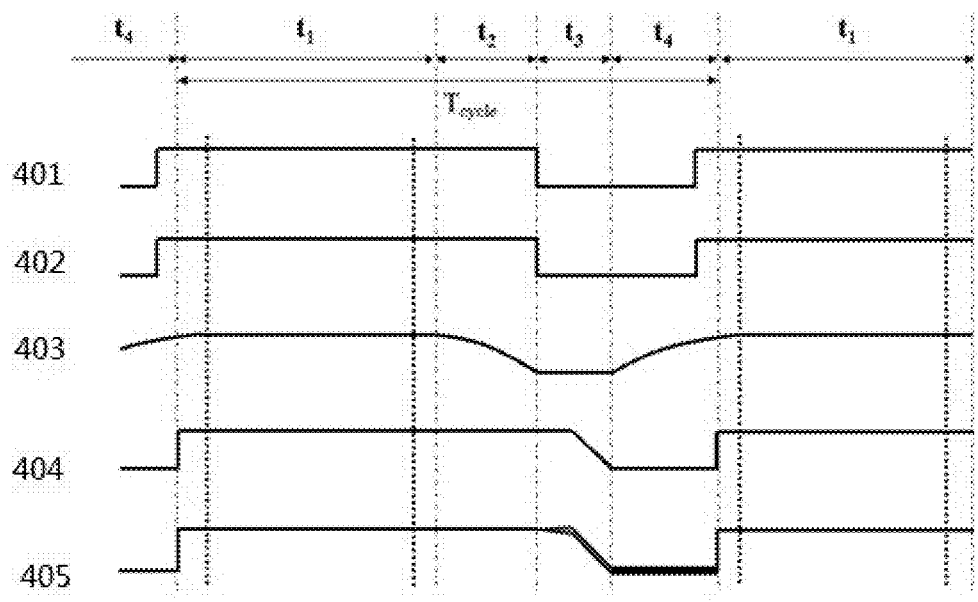
FIG. 4 is a control timing diagram of a magneto-optical trap control apparatus according to the embodiment of the present application.

Reference numbers in FIG. 4:
401 Intensity of 2-D cooling light and back-pumping light
402 Intensity of 2-D push-off light
403 Intensity of 3-D magnetic filed
404 Density of 3-D cooling light and back-pumping light
405 Frequency of 3-D cooling light

DETAILED DESCRIPTION

To make the objectives, features, and advantages of the present application more comprehensible, the present application is further described below in detail with reference to the accompanying drawings and specific implementations.

In the following descriptions, many specific details are described to make the present application fully comprehensible. However, the present application may be implemented in other manners different from those described herein. Therefore, the protection scope of the present application is not limited to specific embodiments disclosed below.

Figure 1:
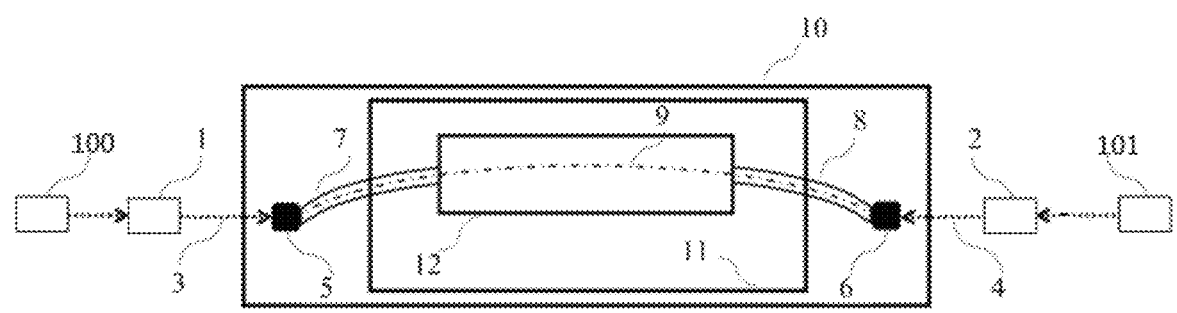
FIG. 1 is a schematic block diagram of a dead-zone-free cold atom interferometer with a high frequency output according to an embodiment of the present application.

As shown in FIG. 1, this embodiment provides a dead-zone-free cold atom interferometer with a high frequency output, having two groups of cold atom group ejection mechanisms. The two groups of cold atom group ejection mechanisms eject cold atom groups to/towards each other. Each group of cold atom ejection mechanisms includes: an atomic generator (100,101), a two-dimensional magneto-optical trap (1,2), and a three-dimensional magneto-optical trap (5,6). The atomic generator is configured to: generate an atomic beam, and transmit the atomic beam to the two-dimensional magneto-optical trap. The two-dimensional magneto-optical trap is configured to: receive the atomic beam, and cool the atoms in the atomic beam, to increase the quantity of cold atoms that enter the three-dimensional magneto-optical trap. A first two-dimensional magneto-optical trap 1 is positioned before a first three-dimensional magneto-optical trap 5. A second two-dimensional magneto-optical trap 2 is positioned before a second three-dimensional magneto-optical trap 6. The cold atom interferometer further includes a first tube 7, a second tube 8, an outer shielding case 10, an inner shielding case 11, and an interference cavity 12. A cold atom group ejected by the three-dimensional magneto-optical trap moves along a path 9 in the interference cavity 12.

Figure 2:
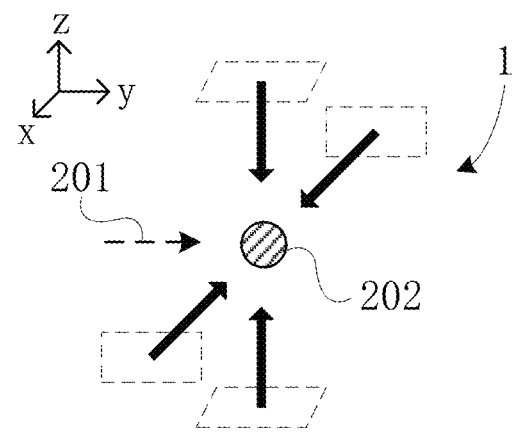
FIG. 2 is a schematic diagram of a two-dimensional magneto-optical trap according to the embodiment of the present application.

Specifically, the two-dimensional magneto-optical trap is configured to provide cold atoms to the three-dimensional magneto-optical trap. A process that the first two-dimensional magneto-optical trap 1 emits cold atoms to the first three-dimensional magneto-optical trap 5 is shown in FIG. 2. Two-dimensional pushing light 201 radiates in the y-axis positive direction at a two-dimensional magneto-optical trap trapping region 202, to push cold atoms in the two-dimensional magneto-optical trap trapping region 202 to enter the first three-dimensional magneto-optical trap 5 along a path 3 (an atomic beam path). Correspondingly, cold atoms trapped in the second two-dimensional magneto-optical trap 2 enter the second three-dimensional magneto-optical trap 6 along a path 4 (an atomic beam path).

The three-dimensional magneto-optical trap includes three groups of light sources 33 (the light sources may emit light or may be a light splitting to split light from an external light source) and three groups of optical stops 34. The three groups of light sources point to a trapping region 31 in the atomic beam path in a two-by-two orthogonal manner. Each group of light sources 33 includes two light sources (the light sources may emit light or may be a light splitting to split light from an external light source). The two light sources are opposite to each other, to use respective emitted light beams to irradiate the trapping region 31. A predetermined angle is formed between the optical axis of the first group of light sources and the atomic beam path. The two light sources of the first group of light sources respectively point to the trapping region 31 in the atomic beam path. The first group of optical stops are arranged at edges of the first group of light sources and downstream of the atomic beam path. Two optical stops of the first group of optical stops partially block laser light emitted from the first group of light sources, respectively. The optical axis of the second group of light sources are orthogonally arranged with respect to the optical axis of the first group of light sources. Two optical stops of the second group of optical stops are arranged at edges of the second group of light sources respectively and downstream of the atomic beam path. Two optical stops of the second group of optical stops partially block laser light emitted from the two light sources of the second group of light sources respectively. The optical axis of the third group of light sources are orthogonally arranged with respect to the optical axis of the second group of light sources and the optical axis of the third group of light sources. Two optical stops of the third group of optical stops are arranged at edges of the third group of light sources respectively and downstream of the atomic beam path. Two optical stops of the third group of optical stops partially block laser light emitted from the third group of light sources respectively. A cold atom group emission region is disposed in the trapping region 31. The first group of optical stops, the second group of optical stops, and the third group of optical stops form a shaded region 32 through blocking. The shaded region 32 falls in the cold atom group emission region.

Figure 3:
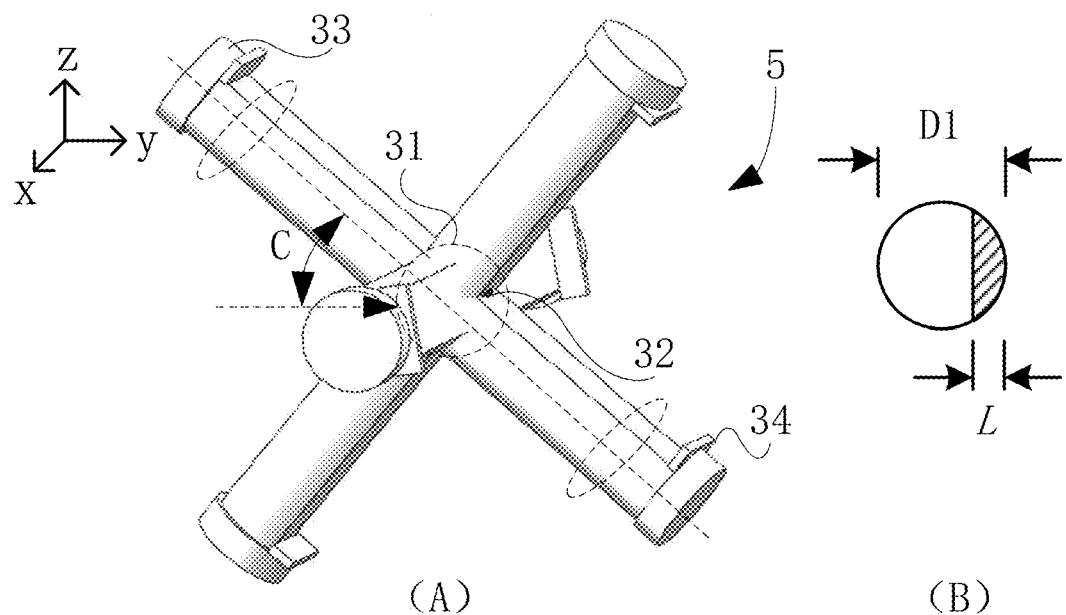
FIG. 3 is a schematic diagram of a three-dimensional magneto-optical trap according to the embodiment of the present application.

Specifically, the first three-dimensional magneto-optical trap 5 in the cold atom interferometer is used as an example. As shown in FIG. 3, an xyz 3D coordinate system is introduced. A direction indicated by a dotted arrow in FIG. 3 (A) is a direction of the atomic beam path. That is, the atomic beam path is arranged along the y-axis. In this case, the downstream of the atomic beam path is the y-axis positive direction. Light beams emitted by the first group of light sources and the second group of light sources in the first three-dimensional magneto-optical trap 5 are parallel to the yz plane. A light-emitting direction of the third group of light sources is parallel to the x axis. The center of the trapping region 31 is located at the origin of the xyz 3D coordinate system. The shaded region 32 is located above the xy plane. The angle between the first group of light sources and the y-axis negative direction satisfies a preset angle C. The value range of the preset angle C is 10° to 40°. The light-emitting directions of the three groups of light sources are orthogonal to each other. Three-dimensional cooling light emitted from the three groups of light sources intersect in the trapping region 31 of the first three-dimensional magneto-optical trap 5. To increase the emission frequency of cold atom groups while ensuring a fixed quantity of cold atoms in a cold atom group to implement dead-zone-free measurement of the cold atom interferometer, the optical stops 34 are respectively arranged on the three groups of light sources. The first group of optical stops are arranged above light path of the first group of light sources. The second group of optical stops are arranged below light path of the second group of light sources. The third group of optical stops are arranged on the right side of light path of the third group of light sources. That is, the three groups of optical stops are located downstream of the atomic beam path (near the y-axis positive direction). The optical stops 34 are arranged to block cooling light emitted by the light sources, to make it convenient to form the shaded region 32 in the trapping region 31.

Since it sets the shaded region 32, when it is determined that a cold atom group enters the shaded region 32 of the trapping region 31 but has not left the trapping region 31, the three-dimensional cooling light and three-dimensional repumping light of the three-dimensional magneto-optical trap are turned on to irrigate on the trapping region 31 (except the shaded region 32) and trap the next cold atom group, to reduce a wait time for the cold atom group to fly out of the shaded region 32. The three-dimensional cooling light and the three-dimensional repumping light in the three-dimensional magneto-optical trap are turned on in advance, to increase the ejection frequency of cold atom groups. In addition, the volume of an effective trapping region of the three-dimensional magneto-optical trap is ensured, which is conducive to increasing a quantity of cold atoms trapped in the cold atom group, thereby implementing dead-zone-free measurement of the cold atom interferometer.

Further, widths blocked by the three groups of optical stops 34 for the three groups of light sources 33 are the same, and a calculation formula of the blocking width is: $L=[((D_1-D_2))/n]$, wherein L is the blocking width, $D_1$ is an output diameter of a light source 33 (or a collimator diameter of a light source), $D_2$ is the diameter of the cold atom group, and n is a preset coefficient.

Specifically, as shown in FIG. 3 (B), it is set that the output diameter of the light source 33 is $D_1$, a cold atom group diameter of the cold atom group trapped by the three-dimensional magneto-optical trap is $D_2$, and a calculation formula of the blocking width L is: $L=[((D_1-D_2))/n]$, wherein the preset coefficient n is generally 4. To ensure that the volume of the three-dimensional trapping region 31 is enough, the calculation result of the blocking width L is rounded down. For example, it is set that the output diameter is $D_1=22$ mm, and the diameter of the cold atom group is $D_2=4.5$ mm. The calculated blocking width is $L=4$ mm.

Further, the cold atom interferometer further includes a magneto-optical trap control apparatus. The magneto-optical trap control apparatus is configured to: when it is determined that the quantity of cold atoms is greater than or equal to a preset value, the magnetic field coil of the three-dimensional magneto-optical trap is turned off. The magneto-optical trap control apparatus is further configured to: when it is determined that a magnetic field generated by the magnetic field coil is zero, gradually reduce the three-dimensional cooling light and the three-dimensional repumping light in the three-dimensional magneto-optical trap according to a preset proportion, and switch the two-dimensional magneto-optical trap to a sleep state. The magneto-optical trap control apparatus is further configured to: when it is determined that the three-dimensional cooling light and the three-dimensional repumping light are off, turn on the magnetic field coil. The magneto-optical trap control apparatus is further configured to: when it is determined that a cold atom group enters the shaded region 32, turn on the three-dimensional cooling light and the three-dimensional repumping light to trap a next cold atom group.

Specifically, as shown in FIG. 4, the adjustment of the two-dimensional magneto-optical trap and the three-dimensional magneto-optical trap by the magneto-optical trap control apparatus may include four preset periods: a trapping stage t1, a magnetic field turn-off stage t2, an adjustment stage t3, and an ejection wait stage t4.

Further, the magneto-optical trap control apparatus is further configured to eject the cold atom group from the first three-dimensional magneto-optical trap to the second three-dimensional magneto-optical trap at a preset speed, so that the cold atom group enters the trapping region of the second three-dimensional magneto-optical trap before the three-dimensional cooling light and the three-dimensional repumping light of the second three-dimensional magneto-optical trap are turned off.

In the trapping stage t1, cold atoms are continuously trapped. When it is determined that a quantity of trapped cold atoms is greater than or equal to the preset quantity, the magneto-optical trap control apparatus turns off the magnetic field coil of the three-dimensional magneto-optical trap. Specifically, the magneto-optical trap control apparatus sets both the two-dimensional magneto-optical trap and the three-dimensional magneto-optical trap to a working state, and the two-dimensional magneto-optical trap emits cooled atoms to the three-dimensional magneto-optical trap. The three-dimensional magneto-optical trap traps the cold atoms, to form a first cold atom group. In a running process of cold atom interference, the cold atom interferometer uses the first three-dimensional magneto-optical trap 5 to eject the first cold atom groups to the second three-dimensional magneto-optical trap 6 at the preset speed, so that after being ejected, the first cold atom group can enter the trapping region in the second three-dimensional magneto-optical trap 6 in the trapping stage t1. Thus, the first three-dimensional magneto-optical trap 5 can further receive a second cold atom group emitted by the second three-dimensional magneto-optical trap 6. Therefore, in the trapping stage t1, the first three-dimensional magneto-optical trap 5 further traps the second cold atom group, and fuse the first cold atom group and the second cold atom group to form a third cold atom group. The lasting time of the trapping stage t1 is usually determined by the quantity of atoms in the third cold atom group.

In the magnetic field turn-off stage t2, after the third cold atom group is formed, the magneto-optical trap control apparatus turns off an anti-Helmholtz magnetic field coil in the three-dimensional magneto-optical trap. A magnetic field in the three-dimensional magneto-optical trap gradually decreases. A magnetic binding force applied to the atoms in the third cold atom group gradually decreases, and the third cold atom group diffuses. In addition, the atoms collide with each other, resulting in a temperature rise in the third cold atom group. Therefore, the lasting time of the magnetic field turn-off stage t2 is preferably as small as possible. After a magnetic field generated by the anti-Helmholtz magnetic field coil is turned off, the two-dimensional magneto-optical trap is switched from the working state to the sleep state, and the two-dimensional magneto-optical trap is turned off. The two-dimensional cooling light, two-dimensional repumping light, and two-dimensional pushing light 201 therein are turned off.

In the adjustment stage t3, the magneto-optical trap control apparatus is further configured to: when it is determined that the magnetic field generated by the magnetic field coil is zero, gradually reduce the three-dimensional cooling light and the three-dimensional repumping light in the three-dimensional magneto-optical trap according to the preset proportion, and switch the two-dimensional magneto-optical trap to the sleep state. The magneto-optical trap control apparatus gradually decreases the light intensity of the three-dimensional cooling light and the three-dimensional repumping light in the three-dimensional magneto-optical trap, to enable the third cold atom group to enter the shaded region 32 formed by the optical stops 34 and fly into the first tube 7 or the second tube 8. The preset proportion may be one of a polygonal function, a geometric decreasing function, or a linear function.

In the ejection wait stage t4, the magneto-optical trap control apparatus is further configured to: when it is determined that the three-dimensional cooling light and the three-dimensional repumping light are off, turn on the magnetic field coil. The magneto-optical trap control apparatus is further configured to: when it is determined that a cold atom group enters the shaded region 32, turn on the three-dimensional cooling light and the three-dimensional repumping light.

A calculation formula that the adjustment stage t3 and the ejection wait stage t4 satisfy is:

$$v \times (t_3 + t_4) = D1 - L,$$

wherein in the formula, v is a speed that the third cold atom group gains in the adjustment stage t3.

Since optical stops 34 are arranged in the three-dimensional magneto-optical trap, when it is determined that the third cold atom group enters the shaded region 32 of the trapping region 31 but has not left trapping region 31, the three-dimensional cooling light and the three-dimensional repumping light of the three-dimensional magneto-optical trap are turned on, and cold atoms and the second cold atom group can enter a trapping state in advance, to reduce the duration of the ejection wait stage t4. That is, a wait time for a cold atom group to fly out of the trapping region 31 is reduced, so that the ejection frequency of the third cold atom group is increased, and dead-zone-free measurement of the cold atom interferometer is implemented. In addition, the fault tolerance of the timing control of the cold atom interferometer can also be increased.

Furthermore, to ensure that an ejection time $t_p$ for the third cold atom group to move from the first three-dimensional magneto-optical trap 5 (or the second three-dimensional magneto-optical trap 6) along the path 9 to reach the second three-dimensional magneto-optical trap 6 (or the first three-dimensional magneto-optical trap 5) is in the trapping stage t1 to ensure the working of the cold atom interferometer, the ejection time $t_p$ should satisfy below relationship:

$$\begin{cases} mT_{cycle} \le t_p \le (m+1)T_{cycle} + t_1 \\ t_p = f(S, v) \\ T_{cycle} = t_1 + t_2 + t_3 + t_4 \end{cases},$$

wherein, a preset multiple m is a positive integer, S is a displacement in an ejection process of the third cold atom group, v is the speed of the third cold atom group, and f(S,v) is a calculation formula of the ejection time $t_p$.

The cold atom interferometer in the present application may be applied to a navigation gyroscope. While the precision of the navigation gyroscope is ensured, that is, a quantity of cold atoms in a cold atom group for interference satisfies a fixed quantity, the ejection frequency of cold atom groups is increased, thereby implementing dead-zone-free measurement of the cold atom interferometer, to enable the navigation gyroscope to implement running without a measurement window period.

By means of the technical solution in the present application, a wait time for a cold atom group to fly out of a trapping region is reduced, to increase the ejection frequency of cold atom groups and the measurement precision of the cold atom interferometer, thereby implementing dead-zone-free measurement of the cold atom interferometer in a measurement process.

It needs to be noted that in an implementation, the light source 33 may be not a light source that emits light, and may be an optical splitter. The optical splitter is configured to receive light from an external light source and split the light, to implement the relaying of the light from the optical splitter.

The external light source may include one laser light generator and a plurality of groups of light sources. The laser light generator is configured to emit laser light to the light source 33 (the optical splitter). The optical splitter performs light splitting, to provide laser light (for example, cooling light, and repumping light) required for the two-dimensional magneto-optical trap and the three-dimensional magneto-optical trap.

A person skilled in the art should understand that if there is a measurement dead zone in the cold atom interferometer but the measurement dead zone is omittable, dead-zone-free measurement discussed in the present application can still be implemented.

Although the present application is disclosed in detail with reference to the accompanying drawings, it should be understood that these descriptions are merely exemplary but are not intended to limit the application of the present application. The protection scope of the present application is defined by the appended claims, and may include various variations, modifications, and equivalent solutions made to the invention without departing from the protection scope and spirit of the present application.

What is claimed is:

1. A dead-zone-free cold atom interferometer with a high frequency output, wherein the interferometer has two cold atom group ejection mechanisms, which eject cold atom groups to each other through an atomic beam path, and each of the cold atom ejection mechanisms comprises: an atomic generator, a two-dimensional magneto-optical trap and a three-dimensional magneto-optical trap;

the atomic generator is configured to: generate atomic beams, and transmit the atomic beams to the two-dimensional magneto-optical trap;

the two-dimensional magneto-optical trap is configured to: receive the atomic beams, and cool the atoms in the atomic beams;

the three-dimensional magneto-optical trap comprises three groups of light sources and three groups of optical stops, wherein the three groups of light sources point to a trapping region and the optical axis of each group of light sources is orthogonal to optical axes of the other two groups of light sources, wherein the atomic beam path passes through the trapping region;

each group of light sources comprises two light sources, and the two light sources are opposite to each other, to send light beams to irradiate the trapping region;

wherein a predetermined angle is formed between the axis of a first group of the light sources and the atomic beam path, each optical stop is arranged at an edge of optical axis of one of the light sources and partially blocks laser light emitted from corresponding light source; and the three groups of optical stops form a shaded region in the trapping region, which region is used for emitting cold atomics.

2. The dead-zone-free cold atom interferometer with a high frequency output of claim 1, wherein it further comprises a magneto-optical trap control apparatus, which is configured to: when it is determined that a cold atom group enters the shaded region, turn on a trap function of the three-dimensional magneto-optical trap to trap a next cold atom group.

3. The dead-zone-free cold atom interferometer with a high frequency output of claim 2, wherein the magneto-optical trap control apparatus is further configured to:

eject the cold atom group from a first three-dimensional magneto-optical trap to a second three-dimensional magneto-optical trap at a preset speed, so that the cold atom group enters the trapping region of the second three-dimensional magneto-optical trap before the trap function of the second three-dimensional magneto-optical trap is turned off.

* * * * *